(12) United States Patent
Junttila et al.

(10) Patent No.: US 11,387,980 B2
(45) Date of Patent: Jul. 12, 2022

(54) HARDWARE MULTIPLE CIPHER ENGINE

(71) Applicant: Nordic Semiconductor ASA, Trondheim (NO)

(72) Inventors: Veli-Pekka Junttila, Oulu (FI); Harri Matomäki, Oulu (FI); James Nevala, Oulu (FI); Matti Tiikkainen, Oulu (FI); Markku Vähätaini, Oulu (FI); Marko Winblad, Oulu (FI)

(73) Assignee: Nordic Semiconductor ASA, Trondheim (NO)

( * ) Notice: Subject to any disclaimer, the term of this patent is extended or adjusted under 35 U.S.C. 154(b) by 178 days.

(21) Appl. No.: 16/955,689

(22) PCT Filed: Dec. 13, 2018

(86) PCT No.: PCT/GB2018/053621
§ 371 (c)(1),
(2) Date: Jun. 18, 2020

(87) PCT Pub. No.: WO2019/122825
PCT Pub. Date: Jun. 27, 2019

(65) Prior Publication Data
US 2020/0313860 A1    Oct. 1, 2020

(30) Foreign Application Priority Data

Dec. 21, 2017 (GB) .................................... 1721608

(51) Int. Cl.
*H04L 9/06* (2006.01)

(52) U.S. Cl.
CPC .......... *H04L 9/0637* (2013.01); *H04L 9/0643* (2013.01); *H04L 9/0662* (2013.01);
(Continued)

(58) Field of Classification Search
CPC ... H04L 9/0618; H04L 9/0637; H04L 9/0643; H04L 9/065; H04L 9/0656; H04L 2209/12; H04L 2209/38
See application file for complete search history.

(56) References Cited

U.S. PATENT DOCUMENTS 4,386,234 A * 5/1983 Ehrsam .............. G06Q 20/3829
380/260
5,809,148 A * 9/1998 Doberstein ........... H04L 9/0637
380/42
(Continued)

FOREIGN PATENT DOCUMENTS

EP    1942626 A1 *  7/2008  ......... H04L 63/0457
EP    2 584 732 A    4/2013
(Continued)

OTHER PUBLICATIONS

IPO Search Report under Section 17(5) for GB 1721608.6, dated Jun. 21, 2018, 3 pages.
(Continued)

*Primary Examiner* — Eric W Shepperd
(74) *Attorney, Agent, or Firm* — Klarquist Sparkman, LLP (57) ABSTRACT

A hardware cipher engine encrypts or decrypts a block of input data from a sequence of blocks using a cipher operation where the block of output data depends on the input block's position in the sequence. In a random-access mode of operation, the engine receives a sequence position, receives a block of input data having that position, and outputs a block of output data without outputting data that encrypts, or that decrypts, every block of input data preceding the received position. In some embodiments, the operation is a stream cipher, and the engine generates a sequence of keystream blocks and performs a combining operation between the input block and a keystream block having a
(Continued)

corresponding sequence position. In other embodiments, the cipher operation is a block cipher, and the engine generates, but doesn't output, blocks of data that encrypt, or decrypt, one or more blocks preceding the received input block.

18 Claims, 4 Drawing Sheets

(52) U.S. Cl.
CPC ...... *H04L 2209/12* (2013.01); *H04L 2209/24* (2013.01); *H04L 2209/38* (2013.01)

(56) References Cited

U.S. PATENT DOCUMENTS

| | | | | |
|---|---|---|---|---|
| 6,226,742 | B1* | 5/2001 | Jakubowski | H04L 9/0637 380/37 |
| 2007/0112972 | A1* | 5/2007 | Yonge, III | H04L 63/0478 709/231 |
| 2007/0230691 | A1* | 10/2007 | Elhamias | H04L 9/0637 380/37 |
| 2007/0237327 | A1 | 10/2007 | Taylor et al. | |
| 2010/0106954 | A1 | 4/2010 | Muchsel et al. | |
| 2010/0332933 | A1* | 12/2010 | Kubota | H04W 12/02 714/E11.023 |
| 2012/0191184 | A1 | 7/2012 | Chen | |
| 2012/0191984 | A1 | 7/2012 | Ohyama | |
| 2014/0270163 | A1* | 9/2014 | Merchan | H04L 9/0869 380/46 |
| 2016/0127880 | A1* | 5/2016 | Drevö | H04W 4/90 455/404.1 |

FOREIGN PATENT DOCUMENTS

| | | |
|---|---|---|
| GB | 1500680 A | 2/1978 |
| WO | WO2017/185312 A | 11/2017 |

OTHER PUBLICATIONS

International Search Report and Written Opinion for PCT/GB2018/053621, dated Mar. 8, 2019, 21 pages.

Sourav Sen Gupta et al., "Designing Integrated Accelerator for Stream Ciphers with Structural Similarities," International Association for Cryptologic Research, Feb. 1, 2020, 20 pages.

"3rd Generation Partnership Project; Technical Specification Group Services and System Aspects; Study on the security aspects of the next generation system (Release 14)," Aug. 2017, 605 pages.

* cited by examiner

HARDWARE MULTIPLE CIPHER ENGINE

CROSS REFERENCE TO RELATED APPLICATIONS

This is the U.S. National Stage of International Application No. PCT/GB2018/053621, filed Dec. 13, 2018, which was published in English under PCT Article 21(2), which in turn claims the benefit of Great Britain Application No. 1721608.6, filed Dec. 21, 2017.

BACKGROUND OF THE INVENTION

The present invention relates to a hardware cipher engine.

Communication and storage systems commonly encrypt data in order to prevent unauthorised third parties from being able to comprehend the data. A cipher is an algorithm that manipulates a "plaintext" message in order to produce an encrypted "ciphertext" message that is unintelligible to third parties but that can be converted back to the plaintext data by authorised users. This is typically achieved through use of a secret key that is known only to authorised participants. In a symmetric cipher, the same key is used for encryption and decryption. A large number of cipher algorithms and associated encryption schemes are known in the art.

One common type of cipher algorithm is known as a "block cipher". A block cipher is a deterministic algorithm that operates on fixed-size blocks of plaintext data in sequence in order to produce a corresponding sequence of fixed-size ciphertext blocks. Block ciphers are mainly associated with symmetric key-based encryption schemes, where the secret key is known to all authorised parties and this secret key is used for both encryption and decryption, although some asymmetric (public-key) encryption schemes can also be regarded as block ciphers. Block ciphers are sometimes contrasted with stream ciphers, in which data is encrypted by being XOR with a keystream. However, in practical implementations stream ciphers typically encrypt blocks of plaintext data in sequence (e.g., 32 bits at a time) and can be regarded simply as a special case of a block cipher. For the purposes of the present application, the term block cipher should be understood as encompassing stream ciphers that encrypt or decrypt data in blocks of one bit or larger.

It is known to implement block ciphers in software or as a dedicated hardware engine (i.e., using an electronic circuit). Because such ciphers are often required to encrypt or decrypt large amounts of data fast, in many situations they are implemented as hardware cipher engines which can encrypt and decrypt data faster than a typical software implementation. Such an approach also frees up any CPU for other tasks. It is known for a hardware block-cipher engine to output generated ciphertext, or decrypted plaintext, onto a memory bus—e.g., when used in a device that supports direct memory access (DMA).

Figure 1:
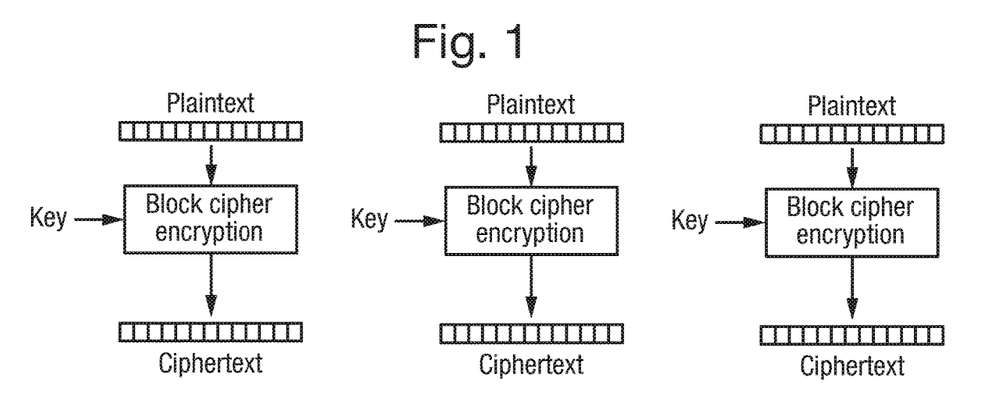
FIG. 1 is a schematic diagram of ECB mode encryption.

Most block ciphers, such as the Advanced Encryption Standard (AES), can be used in various block-cipher modes of operation. The simplest mode is the Electronic Codebook (ECB) mode, in which each block of plaintext data in a sequence of plaintext blocks is encrypted, or decrypted, independently of every other block in the sequence. This is illustrated in FIG. 1, which shows an ECB encryption operation. Decryption, similarly, is performed independently for each block. While simple to implement, this mode has the disadvantage that identical plaintext blocks are encrypted as identical ciphertext blocks. This can allow an attacker to acquire information about the plaintext by identifying repetitions in the ciphertext. It is therefore not sufficiently secure for many purposes.

In other modes of operation, the position a block of plaintext data in a sequence of plaintext blocks (relative to an initial block) affects the value of the ciphertext block generated from that plaintext block. This means that two identical plaintext blocks will not typically be encrypted with the same ciphertext block. These other modes often also use an initialise vector (IV) to obscure the output of the initial ciphertext block. Some examples of such modes of operation are shown in FIGS. 2-6.

Figure 2:
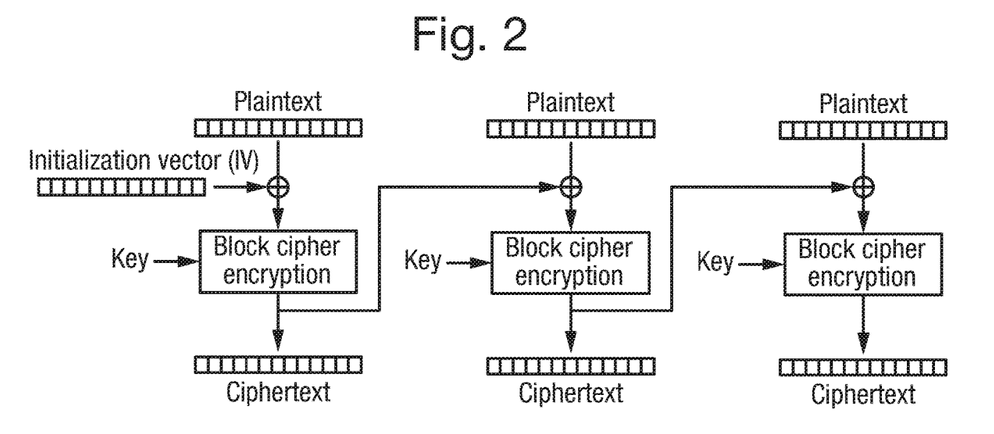
FIG. 2 is a schematic diagram of CBC mode encryption.
Figure 3:
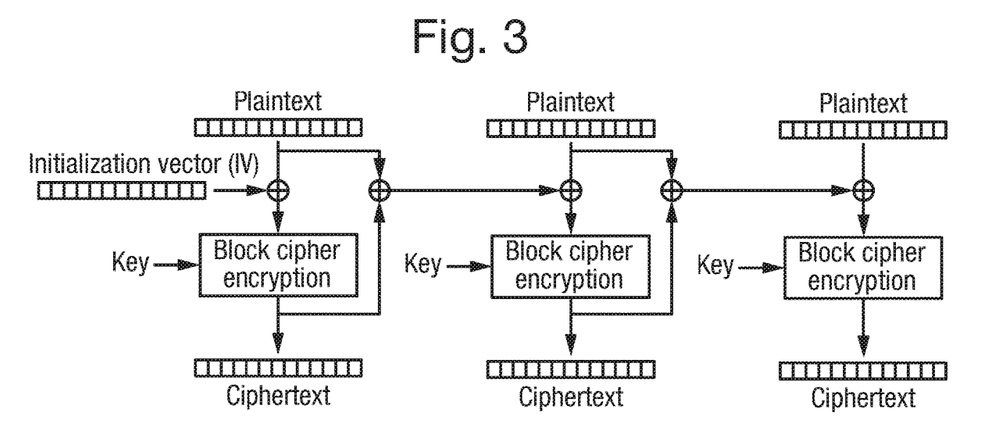
FIG. 3 is a schematic diagram of PCBC mode encryption.
Figure 4:
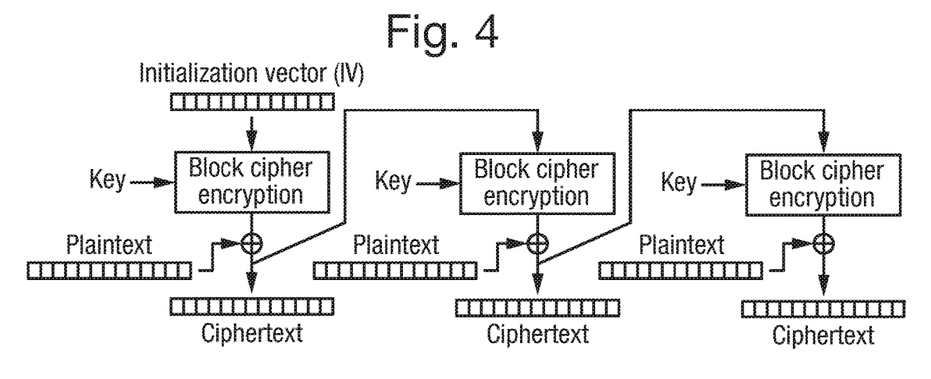
FIG. 4 is a schematic diagram of CFB mode encryption.
Figure 5:
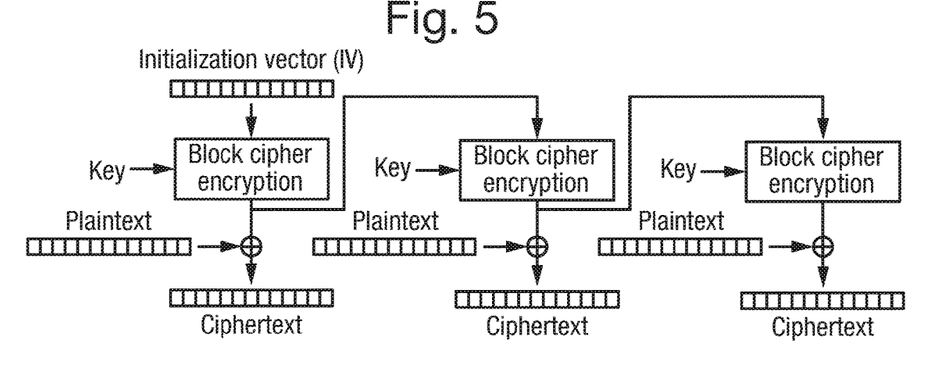
FIG. 5 is a schematic diagram of OFB mode encryption.
Figure 6:
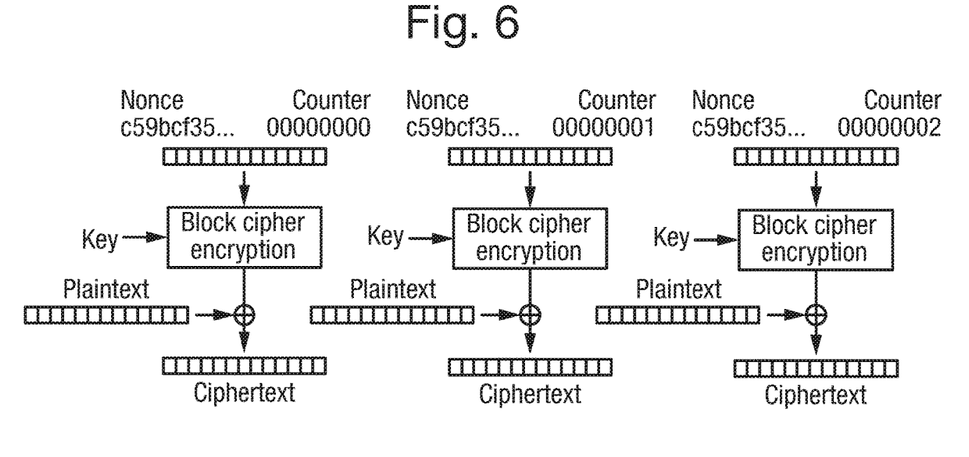
FIG. 6 is a schematic diagram of CTR mode encryption.

FIG. 2 illustrates encryption using a Cipher Block Chaining (CBC) mode. FIG. 3 illustrates encryption using a Propagating Cipher Block Chaining (PCBC) mode. FIG. 4 illustrates encryption using a Cipher Feedback (CFB) mode. FIG. 5 illustrates encryption using an Output Feedback (OFB) mode. FIG. 6 illustrates encryption using a Counter (CTR) mode. The corresponding decryption operations represent further modes of operation.

These modes are more secure than ECB, but they are more complex, with the value of an output block depending not only on the value of the corresponding input block but also on its position in the sequence of input blocks.

Figure 7:
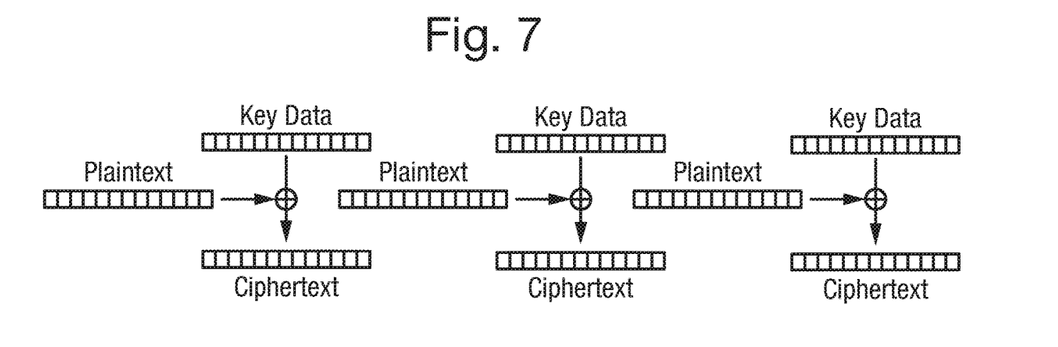
FIG. 7 is a schematic diagram of stream-cipher encryption.

FIG. 7 illustrates encryption using a stream cipher, such as SNOW 3G. Key data is generated as an on-going sequence of blocks (e.g., a sequence of 32-bit blocks in SNOW 3G), derived from a cryptographic key and an initialisation vector. The key data blocks are XOR'd with the sequence of plaintext blocks to generate a sequence of ciphertext blocks. As with the above-mentioned block-cipher modes, the value of a ciphertext block here depends on the corresponding plaintext block and also on the position of the plaintext block within the sequence of plaintext blocks (relative to an initial plaintext block, which is aligned with an initial key data block). The same process can be used for decryption.

While all of these approaches are more secure than a block cipher operating in ECB mode, their position-dependency means that implementations are typically less flexible. For example, when such an implementation is used to encrypt data for communication by a communication device, it is typically necessary for the device to store all the ciphertext output blocks generated from a sequence of plaintext input blocks in a memory of the device until the whole sequence has been successfully communicated over a communication channel. This is because, if a particular ciphertext block were to be corrupted or lost during the communication, the device can then re-read the ciphertext block from memory for retransmission. Only after the whole sequence has been successfully communicated over the channel can the memory be released. This memory requirement is undesirable, especially in a resource-constrained device such as a low-cost wireless sensor device.

The present invention seeks to provide a more flexible hardware cipher engine.

SUMMARY OF THE INVENTION

From a first aspect, the invention provides a hardware cipher engine, comprising:
  a data input for receiving blocks of input data for encryption or decryption;
  an output for outputting blocks of encrypted or decrypted output data onto a memory bus;
  a sequence-position input; and a cipher circuit for encrypting, or for decrypting, a block of input data from a sequence of blocks of input data to generate a block of output data using a cipher operation in which the generated block of output data depends on the block of input data and additionally depends on a position of the block of input data in the sequence of blocks of input data, wherein the hardware cipher engine supports a random-access mode of operation in which the hardware cipher engine is configured to:

receive, at the sequence-position input, an input representative of a position in a sequence of blocks of input data, the received position being after an initial block of input data in the sequence of blocks of input data;

receive, at the data input, the block of input data having the received position in the sequence of blocks of input data;

use the cipher circuit to generate a block of output data that encrypts, or that decrypts, the received block of input data according to said cipher operation, the generated block of output data depending on the received block of input data and additionally depending on the received position; and output the generated block of output data onto the memory bus without outputting onto the memory bus a set of one or more blocks of output data that encrypts, or that decrypts, every block of input data that has a respective position, in the sequence of blocks of input data, that precedes the received position; and wherein i) the cipher operation is a stream cipher, and the hardware cipher engine is configured, when generating said block of output data, to generate a sequence of keystream blocks, including an initial keystream block, and to perform a combining operation between the received block of input data and a keystream block that has a position in the sequence of keystream blocks, relative to the initial keystream block, that is equal to said received position, or ii) the cipher operation is a block cipher and the hardware cipher engine is configured, when operating in the random-access mode, to additionally receive at the data input every block in the sequence of blocks of input data, from the initial block of input data until the block immediately preceding the received position, and, when generating said block of output data, to generate, but not output, one or more blocks of data that encrypt, or decrypt, one or more respective blocks from said additionally-received blocks of input data.

From a second aspect, the invention provides an electronic apparatus comprising such a hardware cipher engine. The electronic apparatus may be a communication device or a data-storage device. It may comprise said memory bus. It may be configured to use the hardware cipher engine to encrypt data for communication over a wireless or wired communication link, such as over a radio channel, or to decrypt data received over such a communication link.

From further aspects, the invention provides a method of operating a hardware cipher engine, wherein the hardware cipher engine comprises a cipher circuit for encrypting or decrypting a block of input data from a sequence of blocks of input data to generate a block of output data using a cipher operation in which the generated block of output data depends on the block of input data and additionally depends on a position of the block of input data in the sequence of blocks of input data, the method comprising:

receiving an input representative of a position in a sequence of blocks of input data, the received position being after an initial block of input data in the sequence of blocks of input data;

receiving the block of input data having the received position in the sequence of blocks of input data;

the cipher circuit generating a block of output data that encrypts, or that decrypts, the received block of input data according to said cipher operation, the generated block of output data depending on the received block of input data and additionally depending on the received position; and outputting the generated block of output data onto the memory bus without outputting onto the memory bus a set of one or more blocks of output data that encrypts, or that decrypts, every block of input data that has a respective position, in the sequence of blocks of input data, that precedes the received position, wherein i) the cipher operation is a stream cipher, and the method comprises the cipher circuit, when generating said block of output data, generating a sequence of keystream blocks, including an initial keystream block, and performing a combining operation between the received block of input data and a keystream block that has a position in the sequence of keystream blocks, relative to the initial keystream block, that is equal to said received position, or ii) the cipher operation is a block cipher, and the method comprises additionally receiving every block in the sequence of blocks of input data, from the initial block of input data until the block immediately preceding the received position, and the cipher circuit, when generating said block of output data, generating, but not outputting, one or more blocks of data that encrypt, or decrypt, one or more respective blocks from said additionally-received blocks of input data.

More generally, from a further aspect, the invention provides a hardware cipher engine, comprising:

a data input for receiving blocks of input data for encryption or decryption;

an output for outputting blocks of encrypted or decrypted output data onto a memory bus;

a sequence-position input; and a cipher circuit for encrypting, or for decrypting, a block of input data from a sequence of blocks of input data to generate a block of output data using a cipher operation in which the generated block of output data depends on the block of input data and additionally depends on a position of the block of input data in the sequence of blocks of input data, wherein the hardware cipher engine supports a random-access mode of operation in which the hardware cipher engine is configured to:

receive, at the sequence-position input, an input representative of a position in a sequence of blocks of input data, the received position being after an initial block of input data in the sequence of blocks of input data;

receive, at the data input, the block of input data having the received position in the sequence of blocks of input data;

use the cipher circuit to generate a block of output data that encrypts, or that decrypts, the received block of input data according to said cipher operation, the generated block of output data depending on the received block of input data and additionally depending on the received position; and output the generated block of output data onto the memory bus without outputting onto the memory bus a set of one or more blocks of output data that encrypts, or that decrypts, every block of input data that has a respective position, in the sequence of blocks of input data, that precedes the received position.

From a further aspect, the invention provides an electronic apparatus comprising such a hardware cipher engine.

Also more generally, from another aspect, the invention provides a method of operating a hardware cipher engine, wherein the hardware cipher engine comprises a cipher circuit for encrypting or decrypting a block of input data from a sequence of blocks of input data to generate a block of output data using a cipher operation in which the generated block of output data depends on the block of input data and additionally depends on a position of the block of input data in the sequence of blocks of input data, the method comprising:
receiving an input representative of a position in a sequence of blocks of input data, the received position being after an initial block of input data in the sequence of blocks of input data;
receiving the block of input data having the received position in the sequence of blocks of input data;
the cipher circuit generating a block of output data that encrypts, or that decrypts, the received block of input data according to said cipher operation, the generated block of output data depending on the received block of input data and additionally depending on the received position; and
outputting the generated block of output data onto the memory bus without outputting onto the memory bus a set of one or more blocks of output data that encrypts, or that decrypts, every block of input data that has a respective position, in the sequence of blocks of input data, that precedes the received position.

In any of the aspects disclosed herein, the hardware cipher engine may be operated to encrypt data, or it may be operated to decrypt data.

Thus it will be seen that, in accordance with the invention, the hardware cipher engine has an input for receiving the position of a particular block in the sequence of input blocks. This allows the hardware cipher engine to generate, and output to a memory bus, an output-data block that encrypts (or decrypts) a specific block of input data within the sequence of input blocks, without the engine first having to output blocks corresponding to all the input blocks located before the specific input block in the sequence. In this way, it is possible for the engine to efficiently re-generate a particular output block on demand.

Such an arrangement can therefore obviate the need to retain an entire output sequence in memory when there is a chance that a particular block of input data may need to be re-encrypted or re-decrypted. The engine can efficiently output a requested output block because the engine does not output all the output blocks preceding the requested block onto the memory bus. This can save considerable time, compared with naively regenerating and outputting the entire sequence of output blocks onto the memory bus. This is because there is typically a significant time cost for outputting data onto the memory bus.

In a preferred set of embodiments, the hardware cipher engine is configured, when in the random-access mode of operation, to output the generated block of output data onto the memory bus without outputting onto the memory bus any block of output data that encrypts, or that decrypts, a block of input data having a position in the sequence of blocks of input data that precedes the received position. It will be appreciated that the time saving is particularly large when no blocks, preceding the requested block, are output onto the bus.

In one set of embodiments, the input data is plaintext data and the output data is ciphertext data. The cipher circuit may be configured to encrypt a block of plaintext data from a sequence of blocks of plaintext data to generate a block of ciphertext data using the cipher operation. When in the random-access mode of operation, the hardware cipher engine may be configured to output the generated block of ciphertext data onto the memory bus without outputting onto the memory bus a set of one or more blocks of ciphertext data that encrypts every (or any) block of plaintext data that has a respective position, in the sequence of blocks of plaintext data, that precedes the received position.

In another set of embodiments, the input data is ciphertext data and the output data is plaintext data. The cipher circuit may be configured to decrypt a block of ciphertext data from a sequence of blocks of ciphertext data to generate a block of plaintext data using the cipher operation. When in the random-access mode of operation, the hardware cipher engine may be configured to output the generated block of plaintext data onto the memory bus without outputting onto the memory bus a set of one or more blocks of plaintext data that decrypts every (or any) block of ciphertext data that has a respective position, in the sequence of blocks of ciphertext data, that precedes the received position.

These first and second sets of embodiments may overlap. Thus, in some embodiments, the hardware cipher engine may support both encryption and decryption. The cipher operations may be the same for encryption and decryption (e.g., with the cipher operation being a stream cipher operation), or there may be an encryption operation and a different decryption operation. The cipher engine may comprise an input for switching the cipher engine between an encryption mode of operation and a decryption mode of operation.

The ability to efficiently re-generate an output block on demand may be especially useful when the output data is ciphertext data for transmission over an unreliable communication link. The ability to efficiently re-generate decrypted plaintext blocks may be useful when a post-processor unit has limited memory and needs to access the decrypted data not only sequentially. However, the invention is not limited only to such applications.

The hardware cipher engine may additionally support a sequential mode of operation. When operating in a sequential model of operation, the hardware cipher engine may be configured to:
receive, at the data input, a sequence of blocks of input data;
use the cipher circuit to generate a sequence of blocks of output data that encrypts, or that decrypts, the sequence of blocks of input data, according to said cipher operation; and
output the generated sequence of blocks of output data onto the memory bus.

The hardware cipher engine may be switchable between the random-access mode of operation and a sequential mode of operation. It may comprise a mode-switching input for receiving an input (e.g., a signal, or a register bit or register value) that determines whether or not the engine operates in the random-access mode. The mode-switching input and the sequence-position input may be the same input—for example, they may comprise a register input, writeable over the memory bus, with the hardware cipher engine being configured to enter the sequential mode of operation in response to a predetermined value (e.g., zero) being written to the register input, and to enter the random-access mode of operation in response to a different value (e.g., a positive integer value) being written to the register input. The different value may identify the aforesaid position in the sequence of blocks of input data.

In some embodiments the cipher operation may be a block-chain mode of operation of a block cipher, such as Cipher Block Chaining (CBC) mode encryption, Propagating Cipher Block Chaining (PCBC) mode encryption or decryption, or Cipher Feedback (CFB) mode encryption.

In other embodiments, the cipher operation may be a stream cipher. The cipher operation may comprise generating or accessing a sequence of keystream blocks. It may comprise performing a combining operation, such as an XOR operation, between a keystream block and the block of input data. The sequence of keystream blocks may have an initial keystream block, and the cipher circuit may be configured to perform the combining operation with a keystream block that has the same received position in the sequence of keystream blocks (relative to the initial keystream block) as the block of input data has in the sequence of blocks of input data.

In some embodiments, the hardware cipher engine may be configured, when operating in the random-access mode, to generate, but not output, one or more output blocks that encrypt (or decrypt) one or more respective input blocks taken from, or consisting of, the sequence of one or more input blocks that starts with the initial block and ends with the block immediately preceding the received position in the sequence. (Note that this assumes that the received position is not the first block in the sequence—of course, the hardware cipher engine may also be configured to respond to a sequence-position input that identifies the initial block by outputting an output block that encrypts, or that decrypts, the initial block; however, it is when the sequence-position input is for a later block in the sequence that the speed benefit is most apparent.) The engine may, for instance, generate each such output block in sequence in an internal register (e.g., with each successive block overwriting the preceding block), but not trigger an output mechanism for outputting the contents of the internal register to the memory bus until the input block at the received position has been encrypted (or decrypted). The hardware cipher engine may therefore be configured, when operating in the random-access mode, to receive every block in the sequence of blocks of input data, from the initial block of input data until the received position, at the data input.

In other embodiments, it may not be necessary for the engine to receive any input block other than the input block at the received position, when operating in the random-access mode. This may be case where the cipher circuit uses a stream cipher in which keystream blocks are combined (e.g. XOR'd) with input blocks, or where the cipher circuit uses a block cipher operating in a block-cipher mode in which the output of one block-cipher encryption (or decryption) operation does not feed into the next block-cipher encryption (or decryption) operation.

The hardware cipher engine may be configured to receive blocks of input data at the data input over the memory bus. The blocks of input data may be "pushed" to the engine—e.g., by being written to a register of the cipher engine—or the engine may be configured to fetch the input data blocks. The engine may be configured to read one or more blocks from an external memory—e.g., using direct memory access (DMA). It may perform a succession of read operations to read in successive blocks from the sequence of input data.

The engine may comprise an input for receiving a memory address from which to fetch one or more blocks of input data. The engine may comprise an input for receiving an amount of data (e.g., a number of blocks) to encrypt or decrypt, when operating in a sequential mode and/or when operating in the random-access mode. The engine may be configured to pad any data, received at the data input, that is less than a full block in size.

The hardware cipher engine may have an input for receiving a key. It may have an input for receiving an initialisation vector (IV) and/or a nonce.

The cipher circuit may implement any appropriate stream or block cipher operation, such as AES, DES, Blowfish, Serpent, Twofish, RC5, KASUMI, SNOW 3G, ZuC, etc., for encrypting or for decrypting the input data. Although unconventional, it is nevertheless possible that, in some embodiments, the cipher circuit might use an asymmetric algorithm, such as RSA encryption, in a block-cipher mode of operation, such as CBC mode.

The input and output blocks may be of any suitable size, such as 32, 64, 128 or 256 bits, or even just one bit. Typically, the input blocks will be the same size as the output blocks, although this is not essential. The sizes of the input and/or output blocks may be fixed by design, or they may be configurable. It is expected that the input block size will typically be constant over a given sequence of input data, although this is not essential.

The block-position input may be a register input, or any other suitable input. The input may be a binary number indicating a number of an input-data block within the sequence—e.g., with the blocks labelled counting up from zero or one, starting from the initial block. However, any appropriate encoding or way of representing a position or particular block in the sequence of input blocks may be used.

The cipher circuit (or circuit portion) may comprise transistors, logic gates, registers, etc. It may comprise one or more linear-feedback shift registers (LFSR). The precise implementation will, of course, depend on what cipher and cipher mode are supported.

Although, it is expected that the hardware cipher engine will typically support a sequential mode of operation, it is possible that some embodiments may not have a built-in sequential mode, or may inherently support only the random-access mode of operation. In this case, the engine could be operated to output a sequence of output blocks, corresponding to the sequence of blocks of input data, by inputting successive position requests (0, 1, 2, 3, etc.) to the block-position input.

An electronic apparatus comprising the hardware cipher engine may be an electronic device, which may be an integrated device. It may be a system-on-chip or a radio-on-a-chip.

The electronic apparatus may comprise said memory bus. It may comprise a memory, such as a random access memory (RAM) and/or a non-volatile memory such as flash. The hardware cipher engine may be configured to receive (e.g., fetch) the input data from said memory. It may output the output data to said memory, over the memory bus (e.g., by writing the output data to one or more memory addresses). The electronic apparatus may comprise a processor for controlling the hardware cipher engine. It may comprise software instructions, stored in a memory of the apparatus, which, when executed by the processor, cause the engine to encrypt or decrypt data.

The electronic apparatus may be configured to transmit one or more messages comprising data encrypted by the cipher engine. The transmission may be from a wired or wireless interface. The apparatus may comprise a radio, such as a Long-Term Evolution (LTE) radio, an LTE Cat M1 (LTE-M) radio, a NarrowBand IoT radio, or an 802.11 WiFi radio, which provides the interface. Alternatively, the interface could be a SCSI connection to a data storage device, or any other suitable interface.

The electronic apparatus may be configured, by hardware and/or software:
- to operate the hardware cipher engine to encrypt a sequence of plaintext data blocks (e.g., in sequential mode);
- to identify a requirement to re-encrypt a particular block of the sequence; and
- to provide an input representative of the particular block to the block-position input of the cipher engine.

The electronic apparatus may be configured to determine that re-encryption is required by, for example, identifying a requirement to re-transmit a particular block over a radio channel—e.g., by receiving a radio message from indicating that corresponding ciphertext block was not received correctly, or by determining that a sector of a hard-drive to which the encrypted ciphertext has been written is corrupted. It may then retransmit the re-generated ciphertext block.

In one set of embodiments, the electronic apparatus is a communication apparatus comprising an output buffer (e.g., a radio output buffer), the input data is plaintext data, and the output data is ciphertext data for communication by the apparatus. The apparatus may implement or conform to a communication standard, such as LTE-M, which requires communicated data, in a particular transaction, to be retained in an output buffer for retransmission in case of a communication problem. Naively, this would be achieved by making the output buffer large enough to store all the communicated data for the transaction. However, the present invention allows the electronic apparatus to have a physical output buffer that is smaller than the communicated data, by using the random-access mode of the hardware cipher engine, to make the output data available for retransmission if required. A receiving device need not notice any difference in the behaviour of the electronic apparatus, while the memory requirements of the electronic apparatus can be reduced.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION

Figure 8:
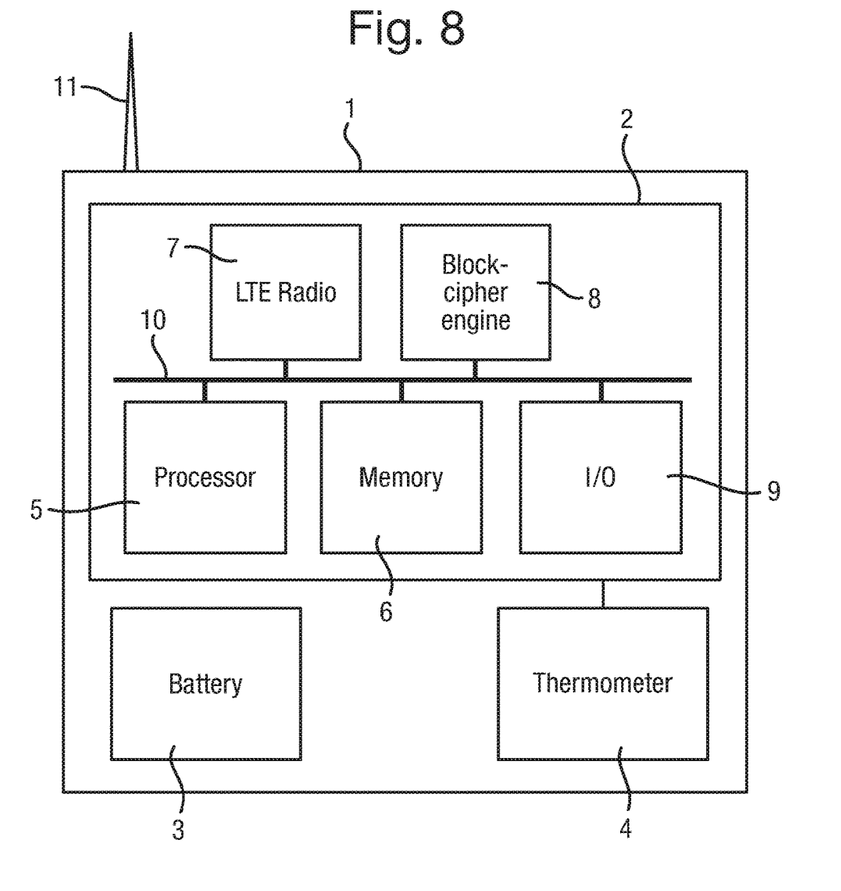
FIG. 8 is a schematic diagram of a wireless temperature sensor embodying the invention.

FIG. 8 shows a wireless temperature sensor 1 which contains an integrated radio chip 2, a battery 3 and a thermometer 4. It also contains other discrete components, such as PCBs, oscillators, capacitors, resistors, etc. which are omitted here for simplicity. The radio chip 2 contains a processor 5, memory 6 (which may include volatile and non-volatile regions), an LTE Cat-M1 (LTE-M) radio 7, a hardware cipher engine 8, and an input/output peripheral 9, such as a USB interface. These elements are all connected to a memory bus 10 which supports DMA. The sensor 1 also has an antenna 11 which is connected to the LTE-M radio 7 (via appropriate off-chip components).

The memory 6 stores software which is executed by the processor 5 for controlling the operation of the sensor 1. The processor 5 uses the I/O peripheral 9 to fetch temperature readings from the thermometer 4 at intervals, and writes these to the memory 6. The wireless temperature sensor 1 periodically transmits a log of temperature information, collected over a period of time, by radio to a network base station (not shown). The log will typically be split over a plurality of data frames, which are transmitted by the LTE-M radio 7. The log data in each frame is encrypted, using the SNOW 3G stream cipher, for privacy reasons. The cipher may be re-initialised, with a respective initialisation vector, for each log-file transmission.

The encryption is achieved by the processor 5 placing the temperature log data for encryption at a particular address in the memory 6, and instructing the cipher engine 8 to encrypt the data. The processor 5 may provide the particular address to the cipher engine 8 as input (e.g., in a register), and may also provide the length of the data to the cipher engine 8. The cipher engine 8 accesses a 128-bit key and a 128-bit initialisation vector from predetermined addresses in the memory 6 (or from register inputs), then begins reading the plaintext data sequentially from the memory 6 in 32-bit blocks, acting as a bus master on the memory bus 10.

Internally, the cipher engine 8 operates in a sequential mode to generate a sequence of 32-bit keystream blocks, according to the SNOW 3G specification. The processor 5 may signal to the cipher engine 8 that it is to operate in sequential mode by writing a "zero" to a block-position register input of the cipher engine 8, or by any other appropriate mechanism. In each encryption-block cycle, the engine 8 reads one 32-bit block of plaintext data, XOR's this with the corresponding keystream block in the sequence, and writes the resulting 32-bit ciphertext block to another address in the memory 6, over the memory bus 10.

As the temperature log data is being encrypted, it is simultaneously transmitted by the LTE-M radio 7, in a plurality of data frames, to the network base station. Starting to transmit the encrypted data before the encryption process is completed saves memory by not having to store the entire encrypted log in an output buffer of the memory 6.

If the network indicates, by radio, that a particular data frame was not received correctly (e.g., it was not received at all, or a checksum for the frame failed), then the sensor 1 must retransmit the relevant frame. Because the ciphertext is not retained in the memory 6 after it has been transmitted, the wireless temperature sensor 1 regenerates the relevant frame.

In order to do so, rather than having to re-encrypt the entire log, the processor 5 provides an input to the cipher engine 8 (e.g., by writing a non-zero value to a sequence-position input register of the cipher engine 8) that instructs the cipher engine 8 to output one or more particular ciphertext blocks—precisely those blocks that are required for the lost data packet. If there are multiple blocks to re-encrypt, the cipher engine 8 may communicate the number of blocks to regenerate to the cipher engine 8 as a value communicated to a length input of the cipher engine 8, or it may request re-encryption of a series of blocks, one block at a time, depending on the design of the cipher engine 8.

The cipher engine 8 enters a random-access mode. It re-initialises the keystream generation, and rapidly moves through the sequence of keystream blocks until it reaches the keystream block corresponding to the requested position in the sequence of plaintext blocks. It does not need to re-read the preceding plaintext blocks, or perform any XOR operations with the preceding keystream blocks—the preceding keystream blocks are simply generated and then discarded internally. Once the requested position is reached, the cipher engine 8 fetches the relevant plaintext block from the memory 6, XOR's it with the corresponding keystream block, and writes the resulting ciphertext block to the memory 6. If further blocks are required, it can continue encrypting plaintext blocks from this position forwards, for however many blocks the processor 5 requires.

The processor 5 can then instruct the LTE-M radio 7 to retransmit the lost data packet, based on the re-encrypted ciphertext data, which will be identical to the originally-generated ciphertext data.

By avoiding having to perform unnecessary plaintext reads, XOR operations, and ciphertext writes over the memory bus 10, relating to blocks that precede the requested block position, the cipher engine 8 can rapidly "fast forward" to the relevant block or blocks.

Figure 9:
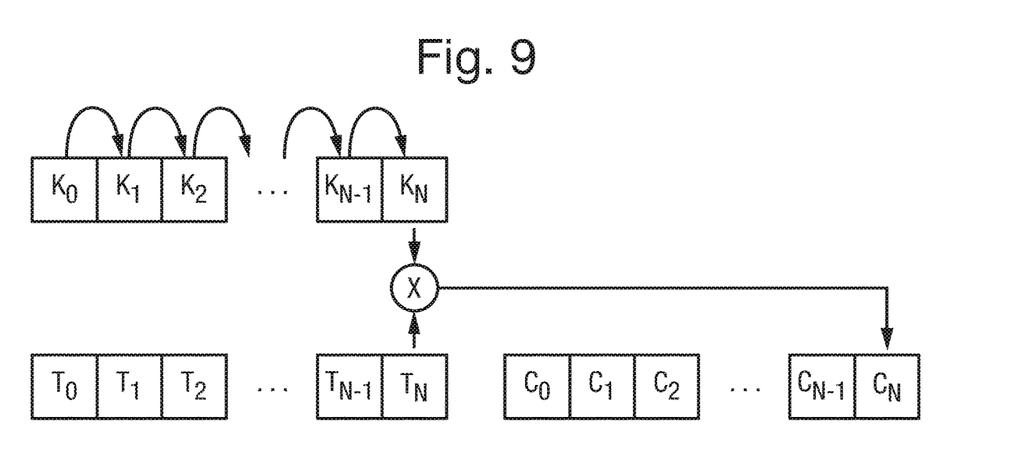
FIG. 9 is a schematic diagram illustrating steps embodying the invention when in a sequential mode.

FIG. 9 illustrates the behaviour of the hardware cipher engine 8 when operating in sequential mode. A sequence of keystream blocks $K_0, K_1, K_2, \ldots$ is generated after the engine 8 enters the sequential mode, which is XOR'd with a corresponding sequence of plaintext blocks $T_0, T_1, T_2, \ldots$ to generate a corresponding sequence of ciphertext blocks $C_0, C_1, C_2, \ldots$.

Figure 10:
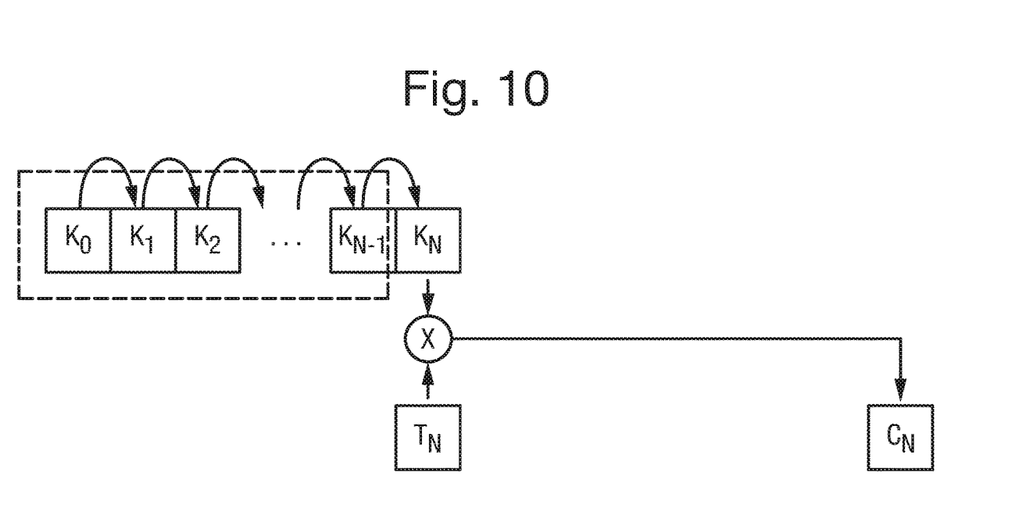
FIG. 10 is a schematic diagram illustrating steps embodying the invention when in a random-access mode.

FIG. 10 illustrates the behaviour of the hardware cipher engine 8 when operating in random-access mode, having received an instruction (e.g., a signal over the memory bus 10) to re-encrypt the Nth block of the plaintext data. The identical sequence of keystream blocks $K_0, K_1, K_2, \ldots$ is generated after the engine 8 enters the random-access mode. However, the blocks $K_0$ to $K_{N-1}$ are simply discarded internally. However, as the Nth keystream block $K_N$ is generated, the cipher engine 8 fetches the Nth block of plaintext data, $T_N$, from the memory 6, and XOR's this with the keystream block $K_N$ to generate the ciphertext block $C_N$. The engine 8 outputs this ciphertext block $C_N$ over the memory bus 10 to the memory 5, but not any of the ciphertext blocks $C_0$ to $C_{N-1}$.

The cipher engine 8 may also support decryption of ciphertext data to plaintext data in substantially the same way as described above, with the blocks $T_0, T_1, T_2, \ldots$ representing ciphertext blocks, and the blocks $C_0, C_1, C_2, \ldots$ representing the decrypted plaintext blocks. The wireless sensor 1 may use the cipher engine 8 for decrypting encrypted data received from the network by the LTE-M radio 7. The sensor 1 would typically use sequential decryption mode for this, but might use the random-access mode when a post-processing operation is performed that requires non-sequential access to the received, decrypted data, in order to reduce memory storage requirements.

It will be appreciated by those skilled in the art that the invention has been illustrated by describing one or more specific embodiments thereof, but is not limited to these embodiments; many variations and modifications are possible, within the scope of the accompanying claims. In particular, any suitable block or stream cipher may be used, and the hardware cipher engine may be used in a wide range of different devices.

The invention claimed is:

1. A radio communication device comprising:
a radio;
a memory bus; and
a hardware cipher engine,
wherein the radio communication device is configured to use the hardware cipher engine to encrypt data for communication over a radio channel by the radio;
wherein the hardware cipher engine comprises:
a data input for receiving blocks of input data for encryption;
an output for outputting blocks of encrypted output data onto the memory bus;
a sequence-position input; and
a cipher circuit for encrypting a block of input data from a sequence of blocks of input data to generate a block of output data using a cipher operation in which the generated block of output data depends on the block of input data and additionally depends on a position of the block of input data in the sequence of blocks of input data,
wherein the hardware cipher engine supports a random-access mode of operation in which the hardware cipher engine is configured to:
receive, at the sequence-position input, an input representative of a position in a sequence of blocks of input data, the received position being after an initial block of input data in the sequence of blocks of input data;
receive, at the data input, the block of input data having the received position in the sequence of blocks of input data;
use the cipher circuit to generate a block of output data that encrypts the received block of input data according to said cipher operation, the generated block of output data depending on the received block of input data and additionally depending on the received position; and
output the generated block of output data onto the memory bus without outputting onto the memory bus a set of one or more blocks of output data that encrypts every block of input data that has a respective position, in the sequence of blocks of input data, that precedes the received position; and
wherein i) the cipher operation is a stream cipher, and the hardware cipher engine is configured, when generating said block of output data, to generate a sequence of keystream blocks, including an initial keystream block, and to perform a combining operation between the received block of input data and a keystream block that has a position in the sequence of keystream blocks, relative to the initial keystream block, that is equal to said received position, or ii) the cipher operation is a block cipher and the hardware cipher engine is configured, when operating in the random-access mode, to additionally receive at the data input every block in the sequence of blocks of input data, from the initial block of input data until the block immediately preceding the received position, and, when generating said block of output data, to generate, but not output, one or more blocks of data that encrypt one or more respective blocks from said additionally-received blocks of input data.

2. The radio communication device of claim 1, wherein the input data is plaintext data, the output data is ciphertext data, and the cipher circuit is configured to encrypt a block of plaintext data from a sequence of blocks of plaintext data to generate a block of ciphertext data using the cipher operation.

3. The radio communication device of claim 1, wherein the hardware cipher engine is configured, when in the random-access mode of operation, to output the generated block of output data onto the memory bus without outputting onto the memory bus any block of output data that encrypts, or that decrypts, a block of input data having a position in the sequence of blocks of input data that precedes the received position.

4. The radio communication device of claim 1, where the hardware cipher engine supports a sequential mode of operation in which the hardware cipher engine is configured to:
  receive, at the data input, a sequence of blocks of input data;
  use the cipher circuit to generate a sequence of blocks of output data that encrypts, the sequence of blocks of input data, according to said cipher operation; and
  output the generated sequence of blocks of output data onto the memory bus.

5. The radio communication device of claim 1, comprising a mode-switching input for receiving an input that determines whether or not the engine operates in the random-access mode.

6. The radio communication device of claim 5, wherein the mode-switching input and the sequence-position input are a common register input, and wherein the hardware cipher engine is configured to enter the sequential mode of operation in response to a predetermined value being written to the common register input, and to enter the random-access mode of operation in response to a value other than the predetermined value being written to the register input, wherein said value other than the predetermined value identifies said position in the sequence of blocks of input data.

7. The radio communication device of claim 1, wherein the cipher operation is a block-chain mode of operation of a block cipher.

8. The radio communication device of claim 7, wherein the cipher operation is a Cipher Block Chaining (CBC) mode encryption, a Propagating Cipher Block Chaining (PCBC) mode encryption, or a Cipher Feedback (CFB) mode encryption.

9. The radio communication device of claim 1, wherein the cipher operation is a block cipher, and wherein the hardware cipher engine is configured, when operating in the random-access mode, to generate, but not output, one or more output blocks that encrypt, or that decrypt, every respective block from said additionally-received blocks of input data.

10. The radio communication device of claim 1, wherein the cipher operation is a stream cipher and wherein the combining operation is an XOR operation.

11. The radio communication device of claim 10, the cipher operation is a SNOW 3G cipher operation.

12. The radio communication device of claim 1, further configured to:
  operate the hardware cipher engine to encrypt a sequence of plaintext data blocks, to generate a sequence of ciphertext data blocks;
  use the radio to transmit the sequence of ciphertext data blocks over the radio channel;
  identify a requirement to re-transmit a particular block of the sequence;
  provide an input representative of the particular block to the block-position input of the cipher engine;
  receive a ciphertext block, corresponding to the particular plaintext block, from the cipher engine; and
  use the radio to transmit the ciphertext block over the radio channel.

13. A method of operating a radio communication device, wherein the radio communication device comprises:
  a radio;
  a memory bus; and
  a hardware cipher engine,
  wherein the hardware cipher engine comprises a cipher circuit for encrypting a block of input data from a sequence of blocks of input data to generate a block of output data using a cipher operation in which the generated block of output data depends on the block of input data and additionally depends on a position of the block of input data in the sequence of blocks of input data, the method comprising:
    the hardware cipher engine receiving an input representative of a position in a sequence of blocks of input data, the received position being after an initial block of input data in the sequence of blocks of input data;
    the hardware cipher engine receiving the block of input data having the received position in the sequence of blocks of input data;
    the cipher circuit generating a block of output data that encrypts, the received block of input data according to said cipher operation, the generated block of output data depending on the received block of input data and additionally depending on the received position
    the hardware cipher engine outputting the generated block of output data onto the memory bus without outputting onto the memory bus a set of one or more blocks of output data that encrypts every block of input data that has a respective position, in the sequence of blocks of input data, that precedes the received position; and
    the radio transmitting the encrypted output data over a radio channel,
  wherein i) the cipher operation is a stream cipher, and the method comprises the cipher circuit, when generating said block of output data, generating a sequence of keystream blocks, including an initial keystream block, and performing a combining operation between the received block of input data and a keystream block that has a position in the sequence of keystream blocks, relative to the initial keystream block, that is equal to said received position, or ii) the cipher operation is a block cipher, and the method comprises additionally receiving every block in the sequence of blocks of input data, from the initial block of input data until the block immediately preceding the received position, and the cipher circuit, when generating said block of output data, generating, but not outputting, one or more blocks of data that encrypt one or more respective blocks from said additionally-received blocks of input data.

14. The method of claim 13, comprising the radio transmitting the encrypted output data over an Long-Term Evolution (LTE) Cat-M1 radio channel or over a NarrowBand Internet of Things (NB-IoT) radio channel.

15. The radio communication device of claim 1, further configured to identify a requirement to re-transmit a particular block of the sequence by receiving a radio message indicating that corresponding ciphertext block was not received correctly.

16. The radio communication device of claim 1, wherein the radio is a Long-Term Evolution (LTE) Cat-M1 radio or a NarrowBand Internet of Things (NB-IoT) radio.

17. The radio communication device of claim 1, wherein the hardware cipher engine is further configured to decrypt blocks of input data received at the data input, and to output decrypted output data onto the memory bus.

18. The radio communication device of claim 1, wherein the radio communication device is an integrated-circuit radio-on-a-chip that comprises the radio, the memory bus, and the hardware cipher engine, and that further comprises a memory connected to the memory bus, and a processor for controlling the hardware cipher engine.

* * * * *